United States Patent
Sawhney

(10) Patent No.: US 11,726,979 B2
(45) Date of Patent: Aug. 15, 2023

(54) DETERMINING A CHRONOLOGICAL ORDER OF TRANSACTIONS EXECUTED IN RELATION TO AN OBJECT STORED IN A STORAGE SYSTEM

(71) Applicant: Oracle International Corporation, Redwood Shores, CA (US)

(72) Inventor: Aditya Sawhney, Erie, CO (US)

(73) Assignee: Oracle International Corporation, Redwood Shores, CA (US)

( * ) Notice: Subject to any disclaimer, the term of this patent is extended or adjusted under 35 U.S.C. 154(b) by 145 days.

(21) Appl. No.: 15/370,165

(22) Filed: Dec. 6, 2016

(65) Prior Publication Data

US 2018/0075082 A1    Mar. 15, 2018

Related U.S. Application Data

(60) Provisional application No. 62/393,811, filed on Sep. 13, 2016.

(51) Int. Cl.
*G06F 16/23* (2019.01)
*G06F 16/24* (2019.01)

(52) U.S. Cl.
CPC ...... *G06F 16/2365* (2019.01); *G06F 16/2379* (2019.01)

(58) Field of Classification Search
CPC .................. G06F 16/2365; G06F 16/2379
See application file for complete search history.

(56) References Cited

U.S. PATENT DOCUMENTS

| | | | |
|---|---|---|---|
| 5,544,347 | A | 8/1996 | Yanai et al. |
| 5,657,453 | A | 8/1997 | Taoka et al. |
| 6,108,748 | A | 8/2000 | Ofek et al. |

(Continued)

FOREIGN PATENT DOCUMENTS

| | | |
|---|---|---|
| CN | 1833232 A | 9/2006 |
| CN | 1938703 A | 3/2007 |
| CN | 101097556 A | 1/2008 |
| CN | 101743546 A | 6/2010 |

(Continued)

OTHER PUBLICATIONS

Silberschatz et al. "Operating System Concepts, 8th Edition". John Wiley & Sons. Jul. 29, 2008. ISBN-13: 978-0-470-12872-5. Accessed Aug. 2019. (Year: 2008).

*Primary Examiner* — Yu Zhao
(74) *Attorney, Agent, or Firm* — Invoke

(57) ABSTRACT

Techniques for determining a chronological order of transactions executed in relation to an object stored in a storage system are disclosed. A transaction history, stored in association with an object, includes information identifying transactions executed in relation to the object. A transaction history manager obtains information describing a state machine from a data repository. The state machine defines a finite set of states that may be assumed by objects stored in the storage system. The state machine specifies transaction types that may be executed from each state. Based on the state machine, the messaging service determines a sequence of states assumed by the object. The messaging service determines a particular transaction that is executable from each state assumed by the object. Hence, the messaging service determines a chronological order of the transactions stored in the transaction history.

15 Claims, 9 Drawing Sheets

(56) References Cited

U.S. PATENT DOCUMENTS

| | | | |
|---|---|---|---|
| 6,157,612 A | 12/2000 | Weerackody et al. | |
| 6,460,052 B1 | 10/2002 | Thomas et al. | |
| 6,604,116 B1* | 8/2003 | Gupta | G06F 13/1626 |
| | | | 707/703 |
| 6,714,553 B1 | 3/2004 | Poole et al. | |
| 7,035,971 B1 | 4/2006 | Merchant | |
| 7,245,624 B2 | 7/2007 | Kramer et al. | |
| 7,263,593 B2 | 8/2007 | Honda et al. | |
| 7,421,458 B2 | 9/2008 | Taylor et al. | |
| 7,707,151 B1 | 4/2010 | Blumenau et al. | |
| 8,484,162 B2 | 7/2013 | Prahlad et al. | |
| 8,521,973 B2 | 8/2013 | Rowan et al. | |
| 8,627,319 B1 | 1/2014 | Xu | |
| 8,645,737 B2 | 2/2014 | Saika | |
| 8,973,034 B1 | 3/2015 | Harvey et al. | |
| 9,037,538 B2 | 5/2015 | Sampathkumar | |
| 9,396,287 B1 | 7/2016 | Bhave et al. | |
| 9,501,507 B1 | 11/2016 | Harris et al. | |
| 9,507,818 B1 | 11/2016 | Stefani et al. | |
| 9,507,843 B1 | 11/2016 | Madhavarapu et al. | |
| 9,524,302 B2 | 12/2016 | Regni et al. | |
| 9,547,459 B1 | 1/2017 | Benhanokh et al. | |
| 9,720,989 B2 | 8/2017 | Theimer et al. | |
| 9,740,565 B1 | 8/2017 | Mitra et al. | |
| 9,798,754 B1 | 10/2017 | Shilane et al. | |
| 9,811,529 B1 | 11/2017 | Rus et al. | |
| 9,846,655 B1 | 12/2017 | Zhao et al. | |
| 9,864,774 B2 | 1/2018 | Marcotte | |
| 10,229,150 B2 | 3/2019 | Marquardt et al. | |
| 10,346,360 B1 | 7/2019 | Basov | |
| 2001/0016843 A1 | 8/2001 | Olson et al. | |
| 2002/0143494 A1 | 10/2002 | Conrad | |
| 2004/0153458 A1 | 8/2004 | Noble et al. | |
| 2004/0215589 A1 | 10/2004 | Boyd et al. | |
| 2005/0010504 A1* | 1/2005 | Gebhard | G06Q 30/04 |
| | | | 705/34 |
| 2005/0049945 A1* | 3/2005 | Bourbonnais | G06F 16/27 |
| | | | 705/30 |
| 2005/0131964 A1 | 6/2005 | Saxena | |
| 2005/0134935 A1* | 6/2005 | Schmidtler | G06F 40/10 |
| | | | 358/448 |
| 2006/0041593 A1* | 2/2006 | Borthakur | G06F 16/10 |
| 2006/0072400 A1 | 4/2006 | Anderson et al. | |
| 2006/0095481 A1 | 5/2006 | Singh et al. | |
| 2006/0106825 A1 | 5/2006 | Cozzi | |
| 2006/0190643 A1 | 8/2006 | Kedem et al. | |
| 2006/0218558 A1 | 9/2006 | Torii et al. | |
| 2006/0271420 A1 | 11/2006 | Anselmann et al. | |
| 2007/0043790 A1 | 2/2007 | Kryger | |
| 2007/0162441 A1 | 7/2007 | Idicula et al. | |
| 2007/0192229 A1 | 8/2007 | Rowan | |
| 2007/0239944 A1 | 10/2007 | Rupanagunta et al. | |
| 2007/0266394 A1* | 11/2007 | Odent | G06Q 10/06 |
| | | | 719/316 |
| 2008/0005146 A1 | 1/2008 | Kubo et al. | |
| 2008/0162610 A1* | 7/2008 | Rossmann | G06F 16/24562 |
| 2009/0043978 A1 | 2/2009 | Sawdon et al. | |
| 2009/0059017 A1 | 3/2009 | Kurokawa | |
| 2010/0049938 A1 | 2/2010 | Izumi et al. | |
| 2010/0162249 A1* | 6/2010 | Shpeisman | G06F 9/466 |
| | | | 718/101 |
| 2010/0205160 A1 | 8/2010 | Kumar et al. | |
| 2010/0257995 A1 | 10/2010 | Kamiya | |
| 2010/0280991 A1 | 11/2010 | Chen et al. | |
| 2010/0322475 A1 | 12/2010 | Ikeda | |
| 2011/0013631 A1 | 1/2011 | Frydman et al. | |
| 2011/0016353 A1 | 1/2011 | Mikesell et al. | |
| 2011/0119100 A1 | 5/2011 | Ruhl et al. | |
| 2011/0164614 A1 | 7/2011 | Begeja | |
| 2011/0196900 A1 | 8/2011 | Drobychev et al. | |
| 2011/0246429 A1 | 10/2011 | Prahlad et al. | |
| 2011/0288974 A1 | 11/2011 | Pearson et al. | |
| 2011/0298520 A1 | 12/2011 | Masson | |
| 2012/0072412 A1 | 3/2012 | Bestgen et al. | |
| 2012/0191724 A1 | 7/2012 | Tucek et al. | |
| 2012/0204007 A1 | 8/2012 | Reid | |
| 2012/0254116 A1 | 10/2012 | Thereska et al. | |
| 2012/0259863 A1 | 10/2012 | Bodwin et al. | |
| 2012/0278553 A1 | 11/2012 | Mudhiganti et al. | |
| 2012/0303913 A1 | 11/2012 | Kathmann et al. | |
| 2012/0311586 A1 | 12/2012 | Inagaki | |
| 2013/0042001 A1 | 2/2013 | Gould et al. | |
| 2013/0282380 A1* | 10/2013 | Mauro | G06Q 20/22 |
| | | | 704/E21.001 |
| 2013/0290249 A1 | 10/2013 | Merriman et al. | |
| 2013/0311422 A1 | 11/2013 | Walker et al. | |
| 2013/0311555 A1 | 11/2013 | Laoutaris et al. | |
| 2013/0326055 A1* | 12/2013 | Chatterjee | H04L 43/04 |
| | | | 709/224 |
| 2014/0040199 A1 | 2/2014 | Golab et al. | |
| 2014/0122022 A1 | 5/2014 | Chen et al. | |
| 2014/0180461 A1 | 6/2014 | Heck et al. | |
| 2014/0188868 A1 | 7/2014 | Hunter et al. | |
| 2014/0189270 A1 | 7/2014 | Iwanicki et al. | |
| 2014/0195510 A1 | 7/2014 | Jourdan et al. | |
| 2014/0207820 A1 | 7/2014 | Lee | |
| 2014/0250281 A1 | 9/2014 | Rao et al. | |
| 2014/0280986 A1 | 9/2014 | Baulier et al. | |
| 2015/0052295 A1 | 2/2015 | Danilak et al. | |
| 2015/0088940 A1 | 3/2015 | Stokely et al. | |
| 2015/0112836 A1 | 4/2015 | Godsey et al. | |
| 2015/0134796 A1 | 5/2015 | Theimer et al. | |
| 2015/0172412 A1* | 6/2015 | Escriva | G06F 16/182 |
| | | | 709/202 |
| 2015/0193477 A1 | 7/2015 | Dumant et al. | |
| 2015/0220558 A1 | 8/2015 | Snibbe et al. | |
| 2015/0234897 A1 | 8/2015 | Kuninobu et al. | |
| 2015/0254257 A1 | 9/2015 | Kritchko et al. | |
| 2015/0278092 A1 | 10/2015 | Smentek et al. | |
| 2015/0278109 A1 | 10/2015 | Vahidsafa et al. | |
| 2015/0302432 A1 | 10/2015 | Chien et al. | |
| 2015/0339314 A1 | 11/2015 | Collins et al. | |
| 2015/0355824 A1 | 12/2015 | Ueno | |
| 2015/0363271 A1 | 12/2015 | Haustein et al. | |
| 2015/0370505 A1 | 12/2015 | Shuma et al. | |
| 2016/0006673 A1 | 1/2016 | Thomas et al. | |
| 2016/0026409 A1 | 1/2016 | Tanaka et al. | |
| 2016/0105370 A1 | 4/2016 | Mellor et al. | |
| 2016/0202693 A1 | 7/2016 | Noda et al. | |
| 2016/0210302 A1 | 7/2016 | Xia | |
| 2016/0255139 A1 | 9/2016 | Rathod | |
| 2016/0275150 A1 | 9/2016 | Bournonnais et al. | |
| 2016/0306822 A1 | 10/2016 | Waghulde | |
| 2016/0335550 A1 | 11/2016 | Achin et al. | |
| 2016/0342486 A1 | 11/2016 | Kedem et al. | |
| 2017/0052717 A1 | 2/2017 | Rawat et al. | |
| 2017/0351543 A1 | 12/2017 | Kimura | |
| 2017/0371887 A1 | 12/2017 | Balasubramanian et al. | |
| 2018/0004560 A1 | 1/2018 | Shankar et al. | |
| 2018/0075069 A1 | 3/2018 | Guim et al. | |
| 2018/0095961 A1 | 4/2018 | Deluca et al. | |

FOREIGN PATENT DOCUMENTS

| | | | |
|---|---|---|---|
| CN | 102200932 A | | 9/2011 |
| CN | 102254238 A | | 11/2011 |
| CN | 102096410 B | * | 6/2012 |
| CN | 103562879 A | | 2/2014 |
| CN | 103620580 A | | 3/2014 |
| CN | 103678442 A | | 3/2014 |
| CN | 103678471 A | | 3/2014 |
| CN | 103678573 A | | 3/2014 |
| CN | 104778196 A | | 7/2015 |
| CN | 105359114 A | | 2/2016 |
| CN | 105637491 A | | 6/2016 |
| CN | 105745627 A | | 7/2016 |
| EP | 2821914 A1 | | 1/2015 |
| GB | 0507102 A | | 6/1939 |
| JP | 3208236 B2 | | 9/2001 |
| KR | 10-2015-0088531 A | | 8/2015 |
| WO | 01/16728 A2 | | 3/2001 |

* cited by examiner

DETERMINING A CHRONOLOGICAL ORDER OF TRANSACTIONS EXECUTED IN RELATION TO AN OBJECT STORED IN A STORAGE SYSTEM

BENEFIT CLAIMS; INCORPORATION BY REFERENCE

This application claims the benefit of U.S. Provisional Patent Application No. 62/393,811, filed Sep. 13, 2016, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to objects stored in a storage system. In particular, the present disclosure relates to determining a chronological order of transactions executed in relation to an object stored in a storage system.

BACKGROUND

Storage systems store objects according to various corresponding storage architectures. Examples of storage architectures include an object storage, a file system, a block storage, and/or a database.

Each object is associated with data and metadata. Data (also referred to herein as "object data") includes, for example, information that is used by an end user and/or a business application. As an example, data for a Sales Application may include information about customers, products, and sales. As another example, data for a Human Resources Application may include information about employees, departments, and salaries. Metadata describes how the data is set up and/or stored. Additionally or alternatively, metadata describes characteristics about the data itself. Metadata may be used to manipulate and/or manage the objects in a storage system.

Various processes are performed in response to changes to the objects in the storage system. As an example, a garbage collector is configured to reclaim memory space for deleted objects. As another example, a statistics engine is configured to maintain a count of the number of objects in the storage system and/or the number of bytes that are utilized in the storage system. As another example, a replication engine is configured to synchronize the objects in the storage system with the objects in a replica storage system. Such processes may need information regarding the objects that are being created, updated, deleted, merged, and/or otherwise modified in order to perform the respective functions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
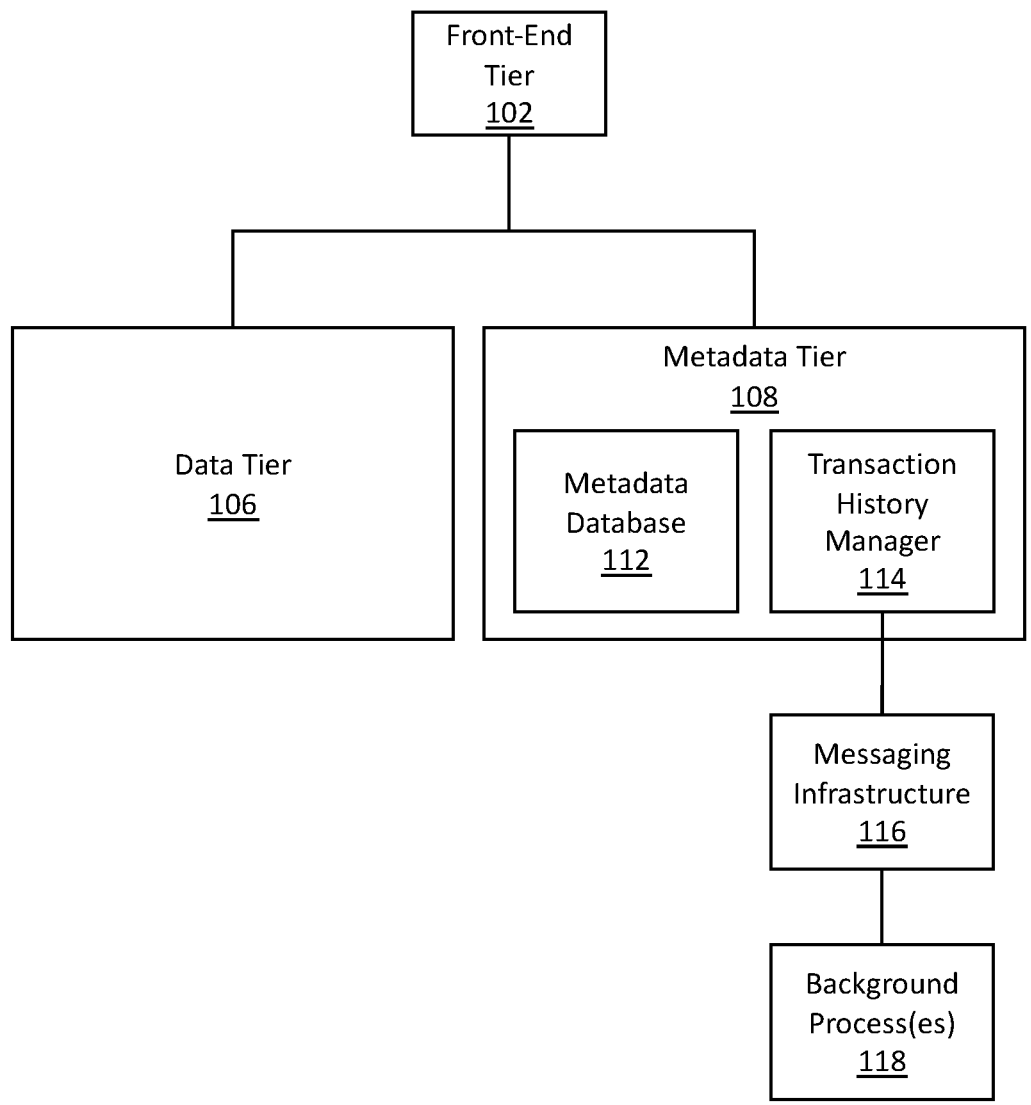
FIG. 1A illustrates a storage system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TRANSACTION HISTORY MANAGEMENT SYSTEM
3. FINITE STATE MACHINE
4. UPDATING METADATA OF AN OBJECT TO STORE A TRANSACTION RECORD
5. PUBLISHING TRANSACTION RECORDS OF AN OBJECT
6. DETERMINING A CHRONOLOGICAL ORDER OF TRANSACTIONS EXECUTED IN RELATION TO AN OBJECT STORED IN A STORAGE SYSTEM
7. MISCELLANEOUS; EXTENSIONS
8. HARDWARE OVERVIEW

1. General Overview

One or more embodiments include determining a chronological order of transactions that were executed in relation to an object stored in a storage system. A finite state machine (also referred to as a "state machine") specifies a finite set of states that may be assumed by the object. The state machine specifies possible transitions between the states. Specifically, the state machine indicates the possible transaction types that may be executed from each state. Based on the state machine, a transaction history manager determines a chronological order of the transactions executed in relation to the object. The transaction history manager obtains the transactions executed in relation to the object from a transition history stored associated with the object.

Beginning with an initial state of the object, the transaction history manager identifies the transaction types executable in relation to the object while the object is in the initial state. The transaction history manager determines that a particular transaction is executable from the initial state of the object based at least on the type of the particular transaction. Based at least on the particular transaction being executable from the initial state of the object, the transaction history manager (a) determines that the particular transaction was executed in relation to the object while the object was in the initial state, and (b) orders the particular transaction as a first transaction in the chronological order of the transactions.

Subsequent to determining the first transaction that was executed in relation to the object while in the initial state, the transaction history manager recursively determines the chronological order of the remaining transactions. The transaction history manager determines a next state ("state n") of the object based on (a) the preceding state (e.g., the initial state or another state referred to herein as "state n−1") and (b) the transaction determined to have been executed in relation to the object while the object was in the state n−1.

The transaction history manager identifies the transaction types executable from state n of the object. The transaction history manager identifies a transaction t executable from state n based on the type of the transaction t. The transaction history manager determines that the transaction t, executable from the state n, is the next transaction in the chronological order of transactions. The transaction history manager identifies the next state n+1, that is subsequent to state n, based on transaction t. The transaction history manager reiterates the process to determine the chronological order of the transactions executed in relation to the object. The transaction history manager transmits and/or publishes information identifying the transactions in accordance with the chronological order.

One or more embodiments described in this Specification and/or recited in the claims may not be included in this General Overview section.

2. Transaction History Management System

FIG. 1A illustrates a storage system, in accordance with one or more embodiments. As illustrated in FIG. 1A, the storage system includes a front-end tier 102, a data tier 106, a metadata tier 108, a messaging infrastructure 116, and one or more background processes 118. In one or more embodiments, the storage system may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, a data tier 106 refers to hardware and/or software configured to store object data associated with objects of a storage system. The object data may be stored in the form of data records. Each data record may store a particular version of object data of an object.

In one or more embodiments, a metadata tier 108 includes a metadata database 112 and a transaction history manager 114.

A metadata database 112 refers to hardware and/or software configured to store metadata associated with objects of a storage system. The metadata may be stored in the form metadata records. Each metadata record may store the metadata corresponding to a particular version of object data of an object.

A transaction history manager 114 is configured to provide various services in relation to the metadata tier 108. Examples of services include storing information identifying transactions executed in relation to an object as metadata, ordering the transactions executed in relation to an object, and transmitting and/or publishing information identifying the transactions executed in relation to an object. Further details regarding the metadata tier 108 are discussed below with reference to FIG. 1B.

The data tier 106 and/or the metadata tier 108 are implemented using one or more data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site.

In one or more embodiments, a front-end tier 102 refers to hardware and/or software configured to expose a user interface and/or an application programming interface (API) for receiving requests to modify objects of a storage system. The API may conform to a Representational State Transfer (REST) architectural style. A request to modify an object causes a transaction to be executed in relation to the object. Types of transactions include, for example, "Commit," "Update," and "Delete." Further details regarding transactions and transaction types are discussed below with reference to FIG. 2.

In one or more embodiments, a messaging infrastructure 116 is a platform configured to process data feeds. The messaging infrastructure 116 receives a stream of data from one or more sources, such as the transaction history manager 114. The messaging infrastructure 116 processes the data and makes the data available to one or more consumers, such as the background processes 118. Examples of messaging infrastructure 116 include but are not limited to Apache Kafka, Amazon Kinesis, and Apache Flume.

In one or more embodiments, a background process 118 is configured to perform functions in relation to the storage system other than reading from or writing to the storage system. A background process 118 may need information regarding the objects that are being created, updated, deleted, merged, and/or otherwise modified in order to perform the functions. As an example, a garbage collector is configured to reclaim memory space for deleted objects. As another example, a statistics engine is configured to maintain a count of the number of objects in the storage system and/or the number of bytes that are utilized in the storage system. The statistics may be used for billing customers of the storage system. As another example, a replication engine is configured to synchronize the objects in the storage system with the objects in a replica storage system.

Figure 1B:
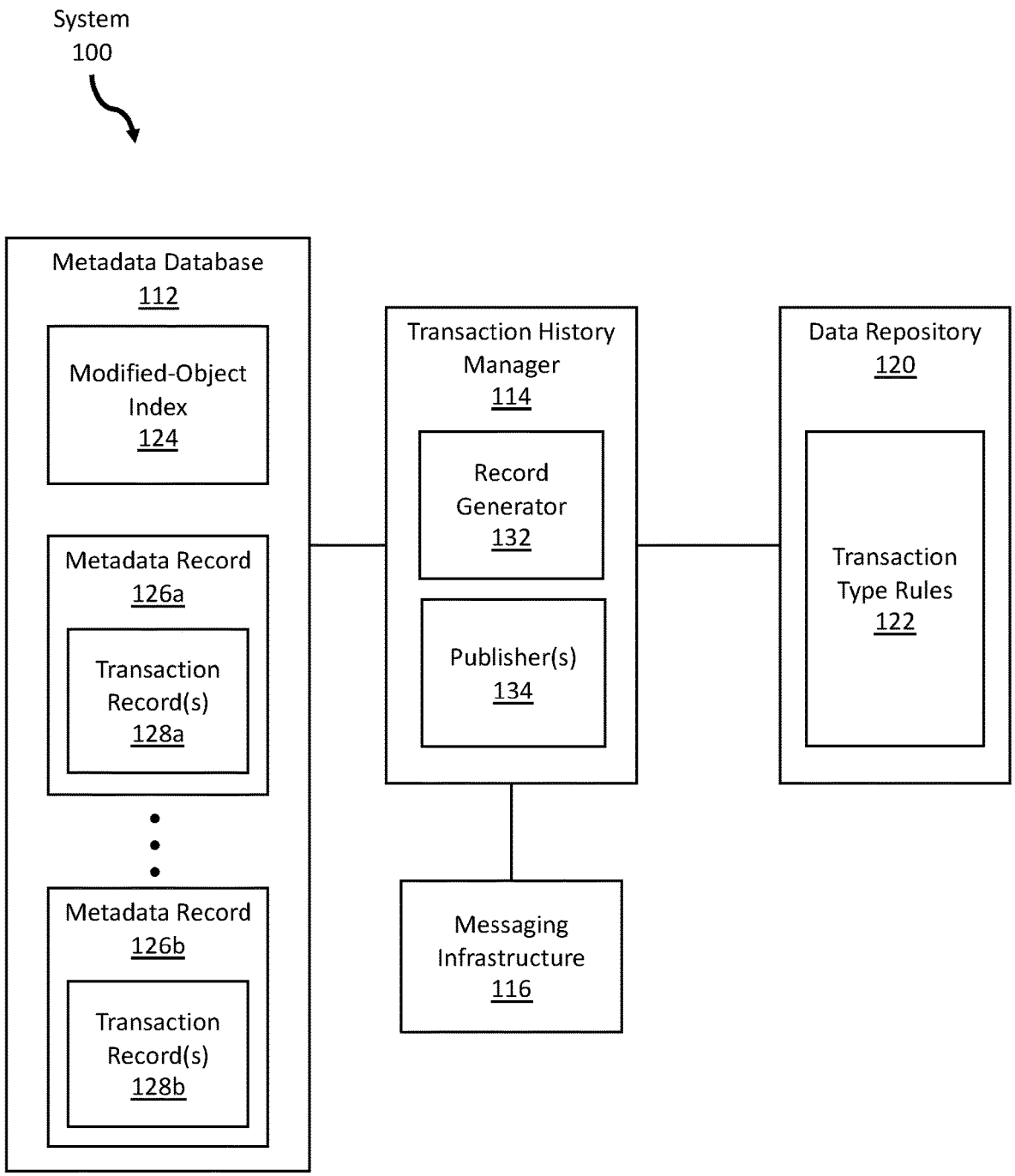
FIG. 1B illustrates a transaction history management system, in accordance with one or more embodiments.

FIG. 1B illustrates a transaction history management system, in accordance with one or more embodiments. As illustrated in FIG. 1B, the transaction history management system 100 includes a metadata database 112, a transaction history manager 114, a messaging infrastructure 116, and a data repository 120. In one or more embodiments, the system 100 may include more or fewer components than the components illustrated in FIG. 1B. The components illustrated in FIG. 1B may be local to or remote from each other. The components illustrated in FIG. 1B may be implemented in software and/or hardware. Each component may be distributed over multiple applications and/or machines. Multiple components may be combined into one application and/or machine. Operations described with respect to one component may instead be performed by another component. The same component illustrated in FIGS. 1A-B is labeled with the same number.

As described above, a metadata database 112 refers to hardware and/or software configured to store metadata associated with objects of a storage system. As illustrated, the metadata database 112 stores one or more metadata records (such as metadata records 126a-b). Each metadata record stores one or more transaction records (such as transaction records 128a-b) associated with an object of the storage system. A set of transaction records associated with an object is also referred to herein as a "transaction history." A transaction record stores information relating to a transaction that is executed in relation to an object. The transaction record may store, for example, a type of the transaction, a time at which the transaction occurred, and a user and/or application that caused execution of the transaction.

In an embodiment, a metadata record stores metadata corresponding to a particular version of object data of an object. An object, for which multiple versions of object data exist, is associated with multiple metadata records. Each metadata record, associated with the same object, may store a full transaction history of the object. Alternatively, each metadata record may store only the portion of the transaction history relevant to the corresponding version of object data of the object. The full transaction history of the object may need to be compiled from multiple metadata records.

In an embodiment, the metadata database 112 stores a modified-object index 124. A modified-object index 124 is an index of only the objects that have been modified since a last publication, to the messaging infrastructure 116, of information identifying transactions executed in relation to objects stored in the storage system. The index does not include objects that have not been modified since the last publication.

As described above, a transaction history manager 114 is configured to provide various services in relation to the metadata tier 108. As illustrated, the transaction history manager 114 includes a record generator 132, and one or more publishers 134.

A record generator 132 stores information identifying transactions executed in relation to an object as metadata in the metadata database 112. Examples of operations for updating metadata of an object to store a transaction record are described below with reference to FIG. 3.

A publisher 136 transmits and/or publishes information identifying the transactions executed in relation to an object to the messaging infrastructure 116. The publisher 136 determines a chronological order of the transactions executed in relation to an object. The publisher 136 publishes information identifying the transactions in accordance with the chronological order.

Multiple publishers 136 may concurrently publish information identifying the transactions executed in relation to objects stored in a storage system. The concurrent publication, by the publishers 136, is coordinated using a set of groups. Each object is assigned to one of a set of groups. Each publisher 136 is assigned to one or more groups, of the set of groups. Each publisher manages and publishes transaction records of objects assigned to a same group as the publisher.

Examples of operations for publishing transaction records of an object are described below with reference to FIGS. 4A-B. Examples of operations for determining a chronological order of transactions executed in relation to an object are described below with reference to FIGS. 5A-B.

In an embodiment, the transaction history manager 114 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In an embodiment, a transaction history manager 114 and/or a publisher 134 determines a chronological order of the transactions executed in relation to an object based on a set of transaction type rules 122. The transaction type rules 122 specify possible sequences of transactions executed in relation to an object based on transaction types. As an example, a set of transaction type rules may indicate that a possible sequence of transactions executed in relation to an object may be: an "Update" transaction, followed by a "Delete" transaction. The set of transaction type rules may indicate that it is not possible to have a sequence of transactions executed in relation to an object include: a "Delete" transaction, followed by an "Update" transaction.

In an embodiment, a set of transaction type rules 122 is specified in the form of a finite state machine (also referred to herein as a "state machine"). The state machine specifies a finite set of states that may be assumed by object stored in a storage system. The state machine specifies possible transitions between the states. Specifically, the state machine indicates the possible transaction types that may be executed from each state. Further details regarding a state machine are discussed below with reference to FIG. 2.

In an embodiment, a set of transaction type rules 122 is stored in a data repository 120. A data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as a transaction history manager 114. Alternatively or additionally, a data repository 120 may be implemented or executed on a computing system separate from a transaction history manager 114. A data repository 120 may be communicatively coupled to a transaction history manager 114 via a direct connection or via a network.

3. Finite State Machine

Figure 2:
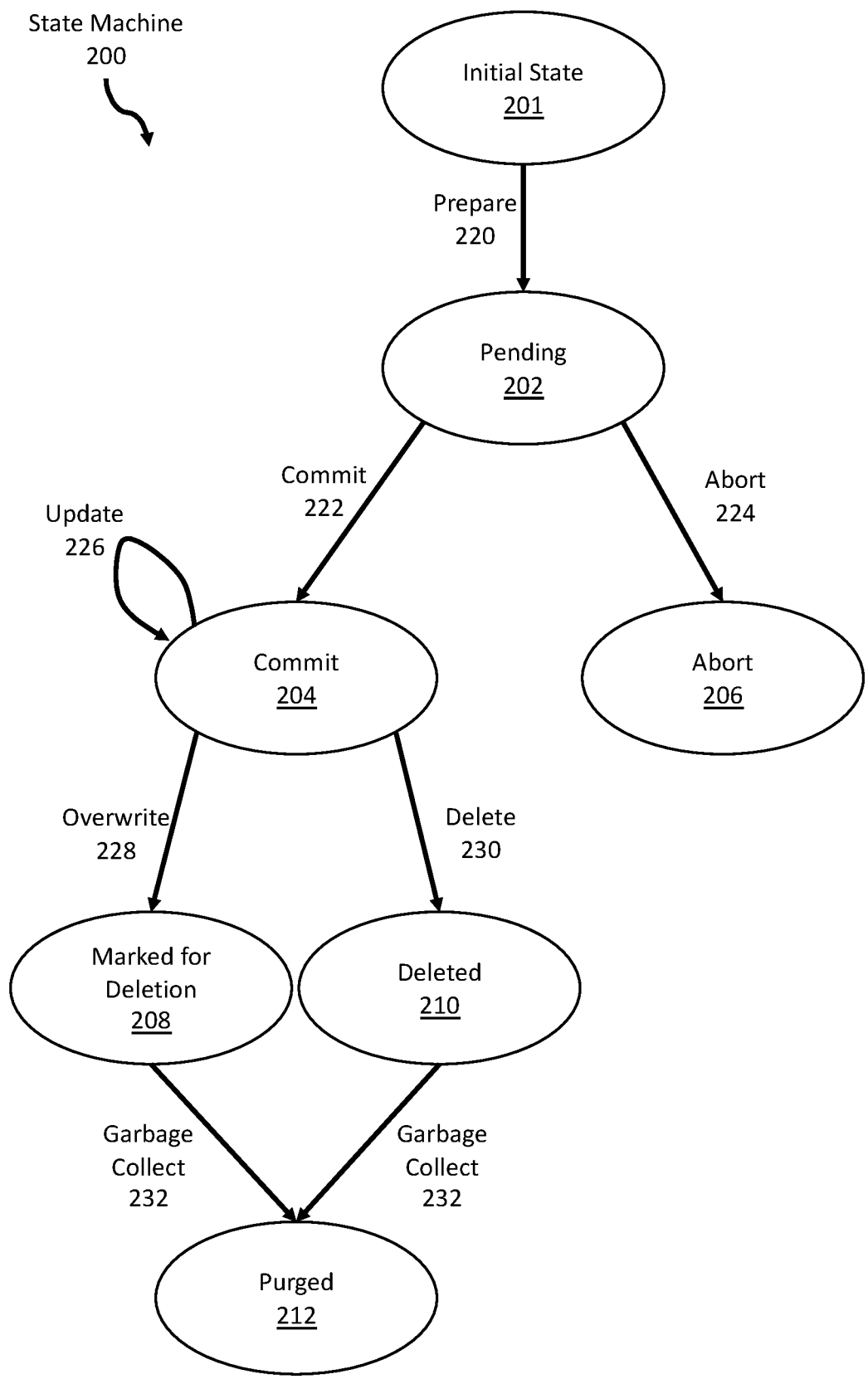
FIG. 2 illustrates an example of a finite state machine, in accordance with one or more embodiments.

FIG. 2 illustrates an example of a finite state machine, in accordance with one or more embodiments. In a storage system including a data tier and a metadata tier, one state machine may govern the data tier and a separate state machine may govern the metadata tier. Specifically, one state machine specifies a finite set of states that may be assumed by data records of objects. Another state machine specifies a finite set of states that may be assumed by metadata records of objects. Transactions of certain types are executable from each state. Execution of a transaction of a particular type transitions a data record or a metadata record from one state to another state.

As illustrated, the state machine 200 specifies the states that may be assumed by a metadata record of an object. The state machine 200 includes the following states: Initial State 201, Pending 202, Commit 204, Abort 206, Marked for Deletion 208, Deleted 210, and Purged 212. In one or more embodiments, a state machine 200 may include more or fewer states than the states illustrated in FIG. 2.

Initially, an object (and the metadata record thereof) is not yet created. The metadata record of the object is in an Initial State 201.

Subsequently, a request to write the object into a storage system may be received. Responsive to the request, a transaction of the type, Prepare 220, may be executed in relation to the object. Execution of the Prepare 220 transaction may include transmitting the metadata associated with the object to a metadata tier of the storage system and storing the metadata into a metadata record associated with the object. The metadata record of the object assumes a Pending 202 state.

Additionally, the object data associated with the object is transmitted to a data tier of the storage system. The object data is stored into a data record associated with the object. The storage system determines whether the metadata record and the data record were successfully generated.

If either the data record or the metadata record was not successfully generated, then an Abort 224 transaction may be executed from the Pending 202 state. The metadata record assumes an Abort 206 state.

Conversely, if the data record and the metadata record were successfully generated, then a Commit 222 transaction may be executed from the Pending 202 state. The metadata record assumes a Commit 204 state.

If a request to update the metadata of the object is received while the metadata record is in a Commit 204 state, then an Update 226 transaction is executed from the Commit 204 state. Execution of the Update 226 transaction may include transmitting the new metadata associated with the object to the metadata tier and overwriting the metadata record with the new metadata. After execution of the Update 226 transaction, the metadata record remains in a Commit 204 state.

If a request to delete the object is received while the metadata record is in a Commit 204 state, then a Delete 230 transaction is executed from the Commit 204 state. The metadata record assumes a Deleted 210 state.

If a request to write a new version of object data of the object is received while the metadata record is in a Commit 204 state, then an Overwrite 228 transaction is executed from the Commit 204 state. Execution of the Overwrite 228 transaction may include transmitting metadata, corresponding to the new version of object data, to the metadata tier, and storing the metadata in a new metadata record. Since the metadata corresponding to the new version of object data is stored in a new metadata record, the metadata record associated with the initial version of the object data may become obsolete. After execution of the Overwrite 228 transaction, the metadata record, associated with the initial version of object data of the object, assumes a Marked for Deletion 208 state.

If a request to perform a garbage collection on the metadata record is received while the metadata record is in either a Marked for Deletion 208 state or a Deleted 210 state, then a Garbage Collect 232 transaction is executed. Execution of the Garbage Collect 232 transaction may include reclaiming the memory space storing the metadata record as memory space that is available for storing new information. Different types of garbage collectors include, for example, a copying collector and a mark-and-sweep collector. After execution of the Garbage Collect 232 transaction, the metadata record assumes a Purged 212 state.

Based on the state machine 200, possible sequences of transactions executed in relation to an object may be determined. As an example, a possible sequence of transactions may include: a Prepare 220 transaction, followed by a Commit 222 transaction, followed by a Delete 230 transaction, followed by a Garbage Collect 232 transaction. A sequence of transactions that is not possible may include: a Delete 222 transaction, followed by a Commit 222 transaction. Another sequence of transactions that is not possible may include: an Abort 224 transaction, followed by an Update 226 transaction.

4. Updating Metadata of an Object to Store a Transaction Record

Figure 3:
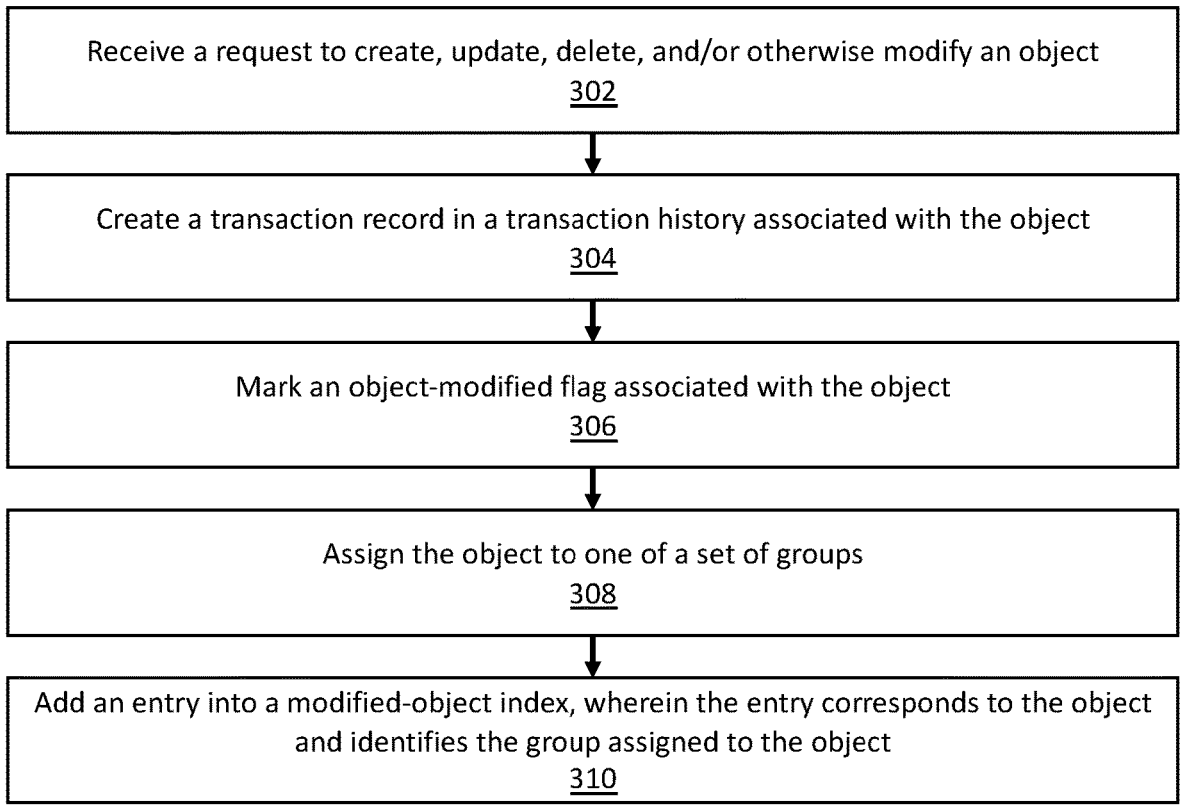
FIG. 3 illustrates an example set of operations for updating metadata of an object to store a transaction record, in accordance with one or more embodiments.

FIG. 3 illustrates an example set of operations for updating metadata of an object to store a transaction record, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include receiving a request to create, update, delete, and/or otherwise modify an object (Operation 302). The request may be based on user input received via a user interface and/or an application programming interface (API). Based on the request, a transaction is executed in relation to the object.

One or more embodiments include creating a transaction record in a transaction history associated with the object (Operation 304). A transaction history manager (and/or a record generator thereof) generates a transaction record including information identifying the transaction that was executed in relation to the object. The transaction history manager stores the transaction record as a next entry in the transaction history associated with the object.

The transaction record identifies a type of the transaction that was executed in relation to the object. Examples of transaction types include Prepare, Commit, Update, Delete, Marked for Deletion, and Garbage Collect. The transaction record may also include additional information. As an example, the transaction record may identify a timestamp associated with the transaction. The timestamp may be determined based on a clock associated with the transaction history manager. As another example, the transaction record may include an identifier of the transaction.

In an embodiment, the transaction record is associated with a published flag. Initially, the published flag is set to clear, indicating that the transaction record has not yet been published.

One or more embodiments include marking an object-modified flag associated with the object (Operation 306). The object-modified flag associated with the object is included in metadata record associated with the object. The transaction history manager marks the object-modified flag to indicate that there is at least one transaction record, associated with the object, that has not yet been published.

One or more embodiments include assigning the object to one of a set of group (Operation 308). The transaction history manager distributes the objects stored in the storage system across the set of groups. The transaction history manager may attempt to achieve an even distribution of the objects across the set of groups. The set of groups is used to coordinate the concurrent publication of information identifying transactions executed in relation to objects stored in the storage system by multiple publishers.

In an embodiment, the transaction history manager may perform a hash operation to assign a particular group to the object. The transaction history manager computes a hash on the object name of the object. The transaction history manager performs a modulo operation on the hash. The modulo, used in the modulo operation, is equal to the desired number of groups. The result of the modulo operation is a group identifier that identifies a group to be assigned to the object.

One or more embodiments include adding an entry into a modified-object index, wherein the entry corresponds to the object and identifies the group assigned to the object (Operation 310). The transaction history manager generates the modified-object index based on the object-modified flag. An entry is created, in the modified-object index, for each object for which the object-modified flag is marked. The modified-object index does not include entries for objects for which the object-modified flag is clear.

An entry, for an object, includes the group identifier of the group assigned to the object. As an example, a prefix of an entry may include the group identifier of the group assigned to an object.

5. Publishing Transaction Records of an Object

Figure 4A:
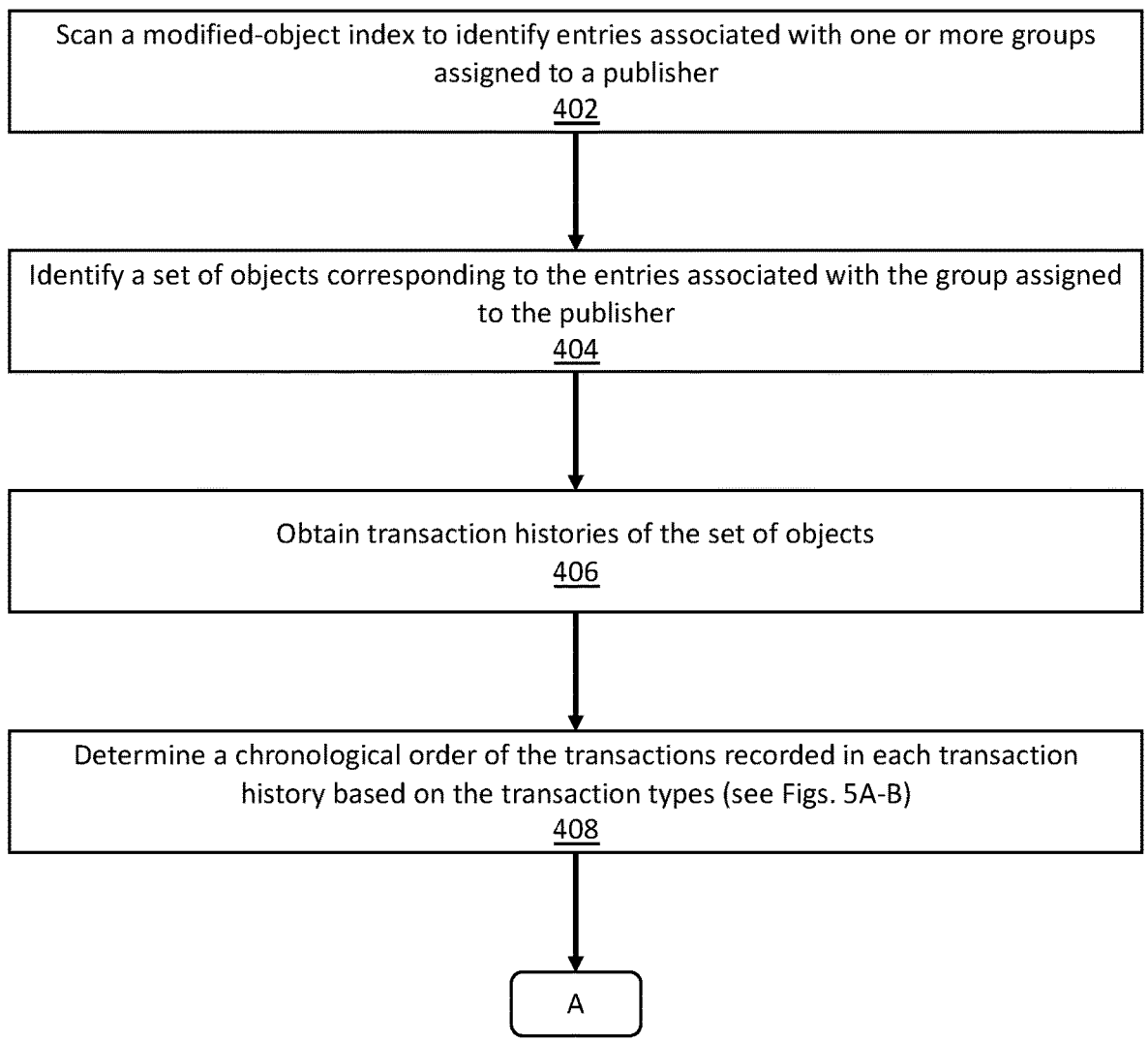
FIGS. 4A-B illustrate an example set of operations for publishing transaction records of an object, in accordance with one or more embodiments.
Figure 4B:
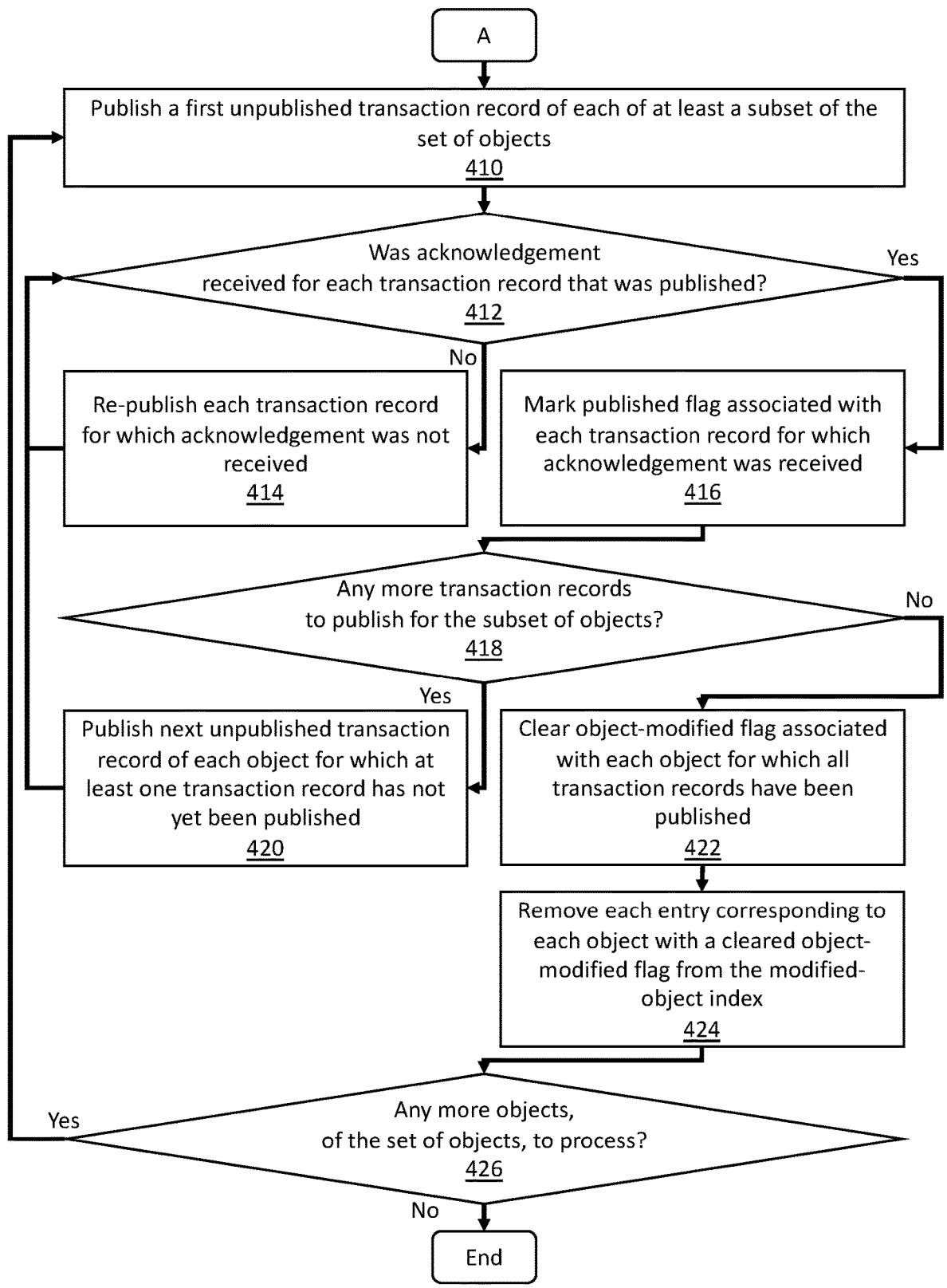

FIGS. 4A-B illustrate an example set of operations for publishing transaction records of an object, in accordance with one or more embodiments. One or more operations illustrated in FIGS. 4A-B may be modified, rearranged, or omitted all together. Accordingly, the particular sequence of operations illustrated in FIGS. 4A-B should not be construed as limiting the scope of one or more embodiments.

The operations illustrated in FIGS. 4A-B may be performed by each of a plurality of publishers. As described above, each object is assigned to one of a set of groups. Additionally, each publisher is assigned to one or more groups, of the set of groups. As described in more detail below with reference to FIGS. 4A-B, each publisher manages the objects assigned to a group associated with the publisher. A publisher may perform the operations illustrated in FIGS. 4A-B periodically and/or in response to an event trigger. The operations illustrated in FIGS. 4A-B may be referred to as operations associated with one "publication cycle."

One or more embodiments include scanning a modified-object index to identify entries associated with one or more groups assigned to a publisher (Operation 402).

The messaging infrastructure, or any other component, may apply an assignment algorithm to assign publishers to groups. Based on the assignment determined by the messaging infrastructure, a particular publisher identifies one or more groups assigned to itself.

Additionally, the publisher obtains a modified-object index from a data repository. The data repository may be a metadata database of the metadata tier of the storage system. Each entry in the modified-object index includes the group identifier of the group assigned to the object corresponding to the entry. The group identifier may be included in, for example, a prefix of the entry. The publisher identifies each entry including a group identifier of a group assigned to the publisher.

One or more embodiments include identifying a set of objects corresponding to the entries associated with the group assigned to the publisher (Operation 404). The publisher identifies the set of objects corresponding to the entries identified at Operation 402. As further described below, the publisher publishes information identifying transactions of the set of objects. The publisher does not publish information regarding objects that are not assigned to a group associated with the publisher.

One or more embodiments include obtaining transaction histories of the set of objects (Operation 406). The publisher obtains the transaction histories from the metadata of the set of objects. The transaction histories may be stored in the metadata database of the metadata tier.

One or more embodiments including determining a chronological order of the transactions recorded in each transaction history based on the transaction type of each transaction (Operation 408). The publisher obtains a set of transaction type rules from a data repository. The publisher determines the chronological order of the transactions, executed in relation to an object, based on the transaction type rules.

In an embodiment, the set of transaction type rules is a state machine. The state machine indicates the possible transaction types that may be executed from each state. Further details regarding determining a chronological order of transactions based on a state machine are described below with reference to FIGS. 5A-B.

In an embodiment, the set of transaction type rules specify possible sequences of transactions executed in relation to an object based on transaction types. The publisher determines a chronological order of the transactions that matches one or more possible sequences of transactions specified by the transaction type rules.

As an example, a transaction history of an object may include the following transactions: a "Commit" transaction; a "Delete" transaction; and a "Garbage Collect" transaction. A publisher may identify a set of transaction type rules from a data repository. One of the possible sequences of transactions, specified by the transaction type rules, may be: a "Commit" transaction→a "Delete" Transaction→a "Garbage Collect" transaction. Based on the transaction type rules, the publisher may order the transactions, recorded in the transaction history of the object, as follows: a "Commit" transaction→a "Delete" Transaction→a "Garbage Collect" transaction.

In an embodiment, the publisher may determine a chronological order of the transactions based on information in addition to the transaction types. It may be necessary to use additional information to determine a chronological order of the transactions if two or more transactions are associated with the same transaction type.

The publisher may order the transactions based on a timestamp associated with each transaction. As an example, a transaction history of an object may include two "Update" transactions. One "Update" transaction may be associated with a timestamp of 9 am. Another "Update" transaction may be associated with a timestamp of 10 a.m. Since the two transactions are associated with the same type, the publisher cannot determine a chronological order of the two transactions based on a set of transaction type rules. The publisher may order the two transactions based on the timestamps. The "Update" transaction associated with a timestamp of 9 am is ordered first; the "Update" transaction associated with 10 am is ordered second.

The publisher may order the transactions based on a sequence in which the transaction records were stored in the transaction history of an object. As an example, a transaction history of an object may include a series of transaction records. The first transaction record stored in the transaction history may describe an "Update" transaction initiated by the user, Joe Smith. The second transaction record stored in the transaction history may describe an "Update" transaction initiated by the user, Mary Jones. The publisher may order the transactions based on the sequence in which the corresponding transaction records are stored in the transaction history. The "Update" transaction by Joe Smith may be ordered first; the "Update" transaction by Mary Jones may be ordered second.

One or more embodiments include publishing a first unpublished transaction record of at least a subset of the set of objects (Operation 410). The publisher identifies the first transaction, in the chronological order of transactions associated with a particular object, that has not yet been published. Information identifying the first transaction is stored in a transaction record, in the transaction history, that is associated with an unmarked published flag. The publisher publishes the transaction record identifying the first transaction to a messaging infrastructure. One or more consumers of the messaging infrastructure may obtain the published transaction record. Examples of consumers include a garbage collector for the storage system, a statistics engine for the storage system, and/or a replication engine for the storage system.

The publisher may concurrently publish multiple transaction records, each associated with a different object, without waiting for an acknowledgement of the publication of a transaction record of any particular object.

One or more embodiments include determining whether an acknowledgement was received for each transaction record that was published (Operation 412). The publisher determines whether an acknowledgement was received from the messaging infrastructure.

For each transaction record for which acknowledgement was not received, the publisher re-publishes the transaction record (Operation 414). The publisher iterates Operation 412 to determine whether an acknowledgement was received. The publisher may continue re-publishing the transaction record until an acknowledgement is received. Additionally or alternatively, the publisher may stop re-publishing the transaction record if a maximum number of attempts have been reached and/or a maximum time period for attempting to publish the transaction record is reached.

For each transaction record for which acknowledgement was received, the publisher (and/or the transaction history manager) marks the published flag associated with the transaction record (Operation 416). The marked published flag indicates that the transaction record has been published.

One or more embodiments include determining whether there are any more transaction records to publish for the subset of objects (Operation 418). The publisher determines whether there are any transaction records, of a particular object, that are associated with an unmarked published flag.

For each object for which at least one transaction record has not yet been published, the publisher publishes the next unpublished transaction record of the object (Operation 420). The publisher iterates Operations 412-418 with respect to the object.

For each object for which all transaction records have been published, the publisher (and/or the transaction history manager) clears the object-modified flag associated with the object (Operation 422). The cleared object-modified flag indicates that there are no more transaction records to publish for the object.

One or more embodiments include removing each entry corresponding to each object with a cleared object-modified flag from the modified-object index (Operation 424). In an embodiment, an entry corresponding to an object with a cleared object-modified flag is removed from the modified-object index. In another embodiment, an updated modified-object index is generated. The updated modified-object index does not include an entry corresponding to an object with a cleared object-modified flag.

One or more embodiments include determining whether there are any more objects, of the set of objects, to process (Operation 426). The publisher determines whether there are any objects, from the set of objects identified at Operation 404, that are associated with at least one unpublished transaction record. An object with at least one unpublished transaction record is an object that needs to be processed.

If there are more objects to process, then the publisher iterates Operations 410-424 with respect to the objects. If all objects have been processed, then the current publication cycle ends. At a next publication cycle, the publisher may repeat performance of Operations 402-426.

Figure 5A:
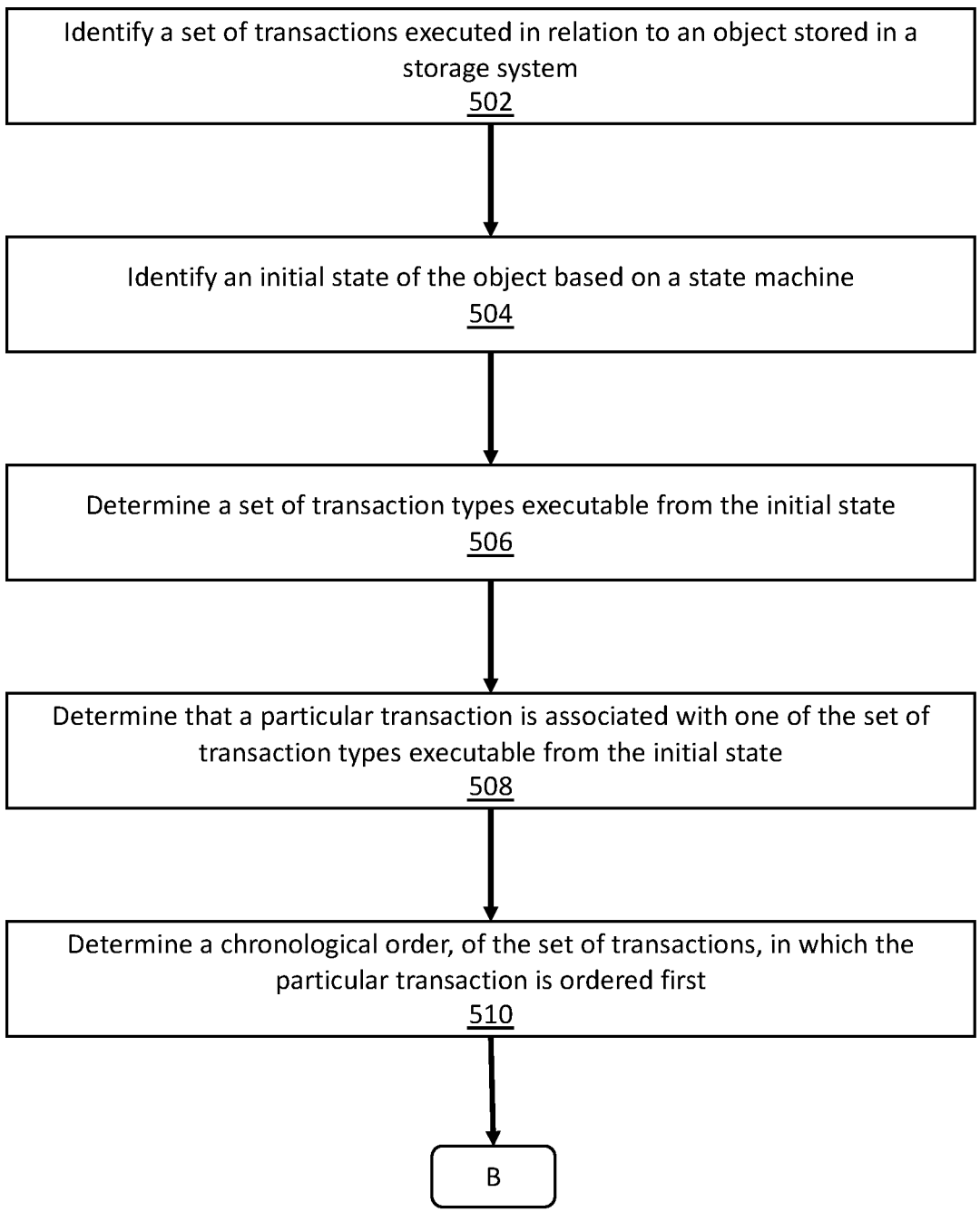
FIGS. 5A-B illustrate an example set of operations for determining a chronological order of transactions executed in relation to an object, in accordance with one or more embodiments.
Figure 5B:
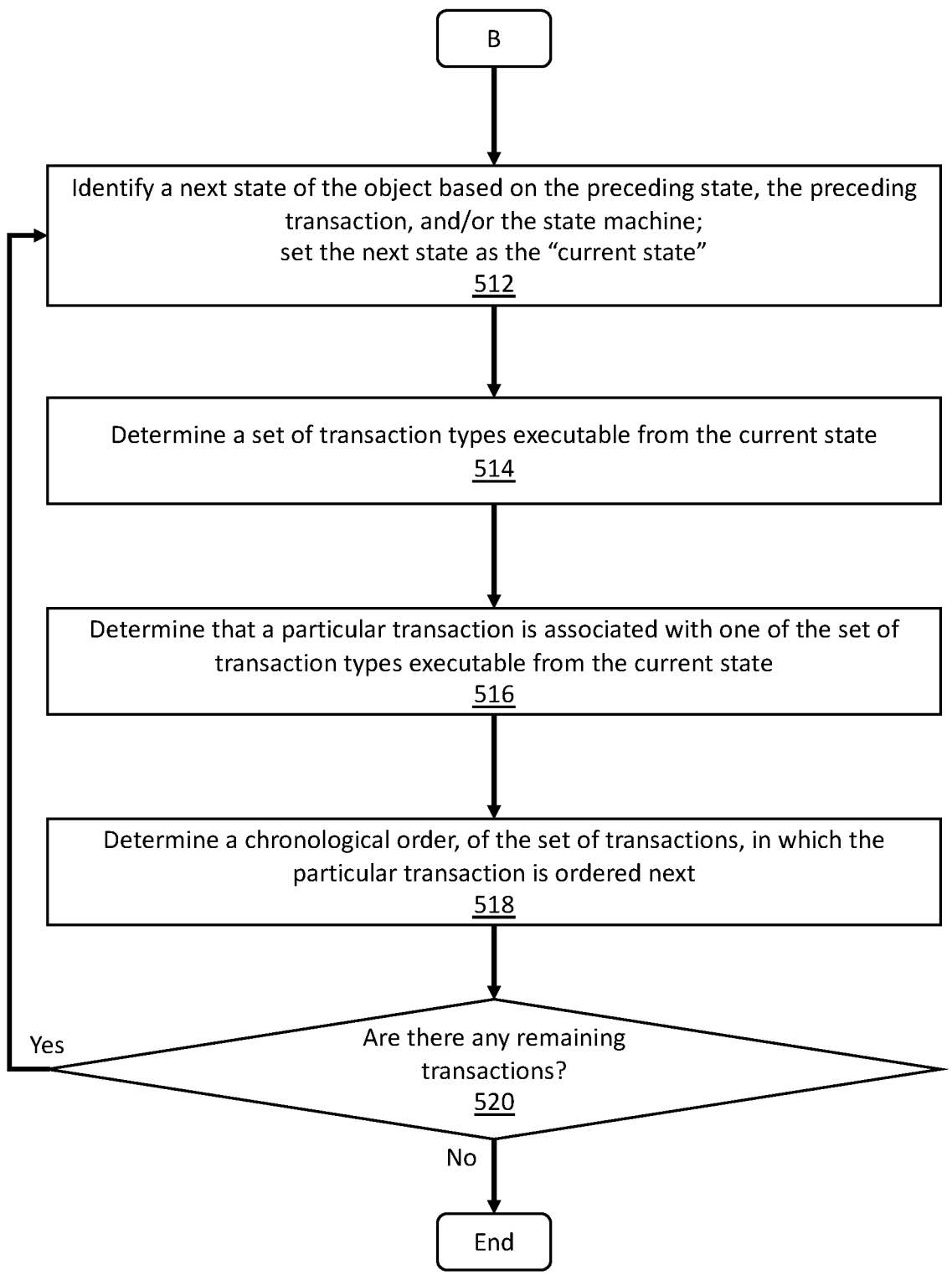

6. Determining a Chronological Order of Transactions Executed in Relation to an Object Stored in a Storage System FIGS. 5A-B illustrates an example set of operations for determining a chronological order of transactions executed in relation to an object, in accordance with one or more embodiments. One or more operations illustrated in FIGS. 5A-B may be modified, rearranged, or omitted all together. Accordingly, the particular sequence of operations illustrated in FIGS. 5A-B should not be construed as limiting the scope of one or more embodiments.

The operations illustrated in FIGS. 5A-B may be executed as part of Operation 408 of FIG. 4. Additional and/or alternative methods for determining a chronological order of the transactions executed in relation to an object are described above with reference to Operation 408.

The operations illustrated in FIGS. 5A-B are described in relation to the example state machine 200 illustrated in FIG. 2. However, any state machine may be used for determining a chronological order of the transactions executed in relation to an object.

One or more embodiments include identifying a set of transactions executed in relation to an object stored in a storage system (Operation 502). As described above with reference to Operation 406, the publisher obtains a transaction history of an object. The transaction history includes information identifying the set of transactions executed in relation to the object.

As an example, a transaction history of an object may include four transaction records. The transaction records are associated with the following transaction types, respectively: Commit, Delete, Garbage Collect, and Prepare. Based on the transaction history, the publisher identifies a set of transactions executed in relation to an object as: a Commit transaction, a Delete transaction, a Garbage Collect transaction, and a Prepare transaction.

One or more embodiments include identifying an initial state of the object based on a state machine (Operation 504). The publisher obtains information describing the state machine from a data repository. The state machine specifies a finite set of states, including an initial state, that may be assumed by objects stored in the storage system. The publisher identifies the initial state of the object based on the state machine.

Referring to the state machine 200 as an example, the publisher identifies Initial State 201 as an initial state of the object.

One or more embodiments include determining a set of transaction types executable from the initial state (Operation 506). The state machine indicates possible transaction types that may be executed from each state. The publisher identifies the set of transaction types executable from the initial state based on the state machine.

Referring again to the state machine 200, the state machine 200 indicates that the transaction type, Prepare 220, is executable from the Initial State 201. Based on the state machine 200, the publisher determines that transactions of the type, Prepare 200, are executable from the Initial State 201.

One or more embodiments include determining that a particular transaction, of the sets of transactions identified at Operation 502, is associated with one of the set of transaction types executable from the initial state (Operation 508). The publisher compares transaction types of the set of transactions executed in relation to the object (identified at Operation 502) against the transaction types executable from the initial state (identified at Operation 506). The publisher determines that a particular transaction, of the set of transactions executed in relation to the object, is associated with one of the transaction types executable from the initial state.

Continuing the above example, the set of transactions executed in relation to the object is: a Commit transaction, a Delete transaction, a Garbage Collect transaction, and a Prepare transaction. Referring to the state machine 200, the publisher identifies the transaction type, Prepare 220, as executable from the Initial State 201. Hence, the publisher determines the Prepare transaction that was executed in relation to the object as a transaction that is executable from the initial state of the object. The Commit, Delete, and Garbage Collect transactions are not executable from the initial state of the object.

One or more embodiments include determining a chronological order, of the set of transactions, in which the particular transaction is ordered first (Operation 510). The publisher determines that the particular transaction identified at Operation 508 was executed in relation to the object while the object was in the initial state. Additionally, the publisher orders the particular transaction identified at Operation 508 as a first transaction in the chronological order of the set of transactions that were executed in relation to the object.

Continuing the above example, the publisher has already determined that the Prepare transaction is executable from the initial state of the object. Hence, the publisher determines that the Prepare transaction was executed from the initial state of the object. Additionally, the publisher determines that the Prepare transaction is first in a chronological order of the set of transactions executed in relation to the object.

One or more embodiments include identifying a next state of the object based on the preceding state, the preceding transaction, and/or the state machine (Operation 512). The next state is set as the "current state."

The publisher traces through the states of the state machine using the preceding state and the preceding transaction executed on the object.

Continuing the above example, the set of transactions executed in relation to an object is: a Commit transaction, a Delete transaction, a Garbage Collect transaction, and a Prepare transaction. The publisher has already determined that the Prepare transaction was executed in relation to the object while the object was in the initial state. Based on Operation 512, the publisher traces through the states of the state machine based on the preceding state (Initial State 201) and the preceding transaction (Prepare 220). Based on the state machine 200, after executing a Prepare 220 transaction from the Initial State 201, the next state is Pending 202. Hence, the publisher determines that the next state is Pending 202. The publisher sets Pending 202 as the "current state."

One or more embodiments include determining a set of transaction types executable from the current state (Operation 514). The state machine indicates possible transaction types that may be executed from each state. The publisher identifies the set of transaction types executable from the current state based on the state machine.

Continuing the above example, the current state is now Pending 202. The state machine 200 indicates that the transaction types, Commit 222 and Abort 224, are executable from the Pending 202 state. Based on the state machine 200, the publisher determines that transactions of the type, Commit 222 or Abort 224, are executable from the Pending 202 state.

One or more embodiments include determining that a particular transaction is associated with one of the set of transaction types executable from the current state (Operation 516). The publisher compares transaction types of the set of transactions executed in relation to the object (identified at Operation 502) against the transaction types executable from the current state (identified at Operation 514). The publisher determines that a particular transaction, of the set of transactions executed in relation to the object, is associated with one of the transaction types executable from the current state.

Continuing the above example, the set of transactions executed in relation to an object is: a Commit transaction, a Delete transaction, a Garbage Collect transaction, and a Prepare transaction. The current state is now Pending 202. The publisher has already determined that transactions of the type, Commit 222 or Abort 224, are executable from the Pending 202 state. Hence, at Operation 516, the publisher determines the Commit transaction that was executed in relation to the object as a transaction that is executable from the current state of the object. The Delete, Garbage Collect, and Prepare transactions are not executable from the current state of the object.

One or more embodiments include determining a chronological order, of the set of transactions, in which the particular transaction is ordered next (Operation 518). The publisher determines that the particular transaction identified at Operation 516 was executed in relation to the object while the object was in the current state. Additionally, the publisher orders the particular transaction identified at Operation 516 as the next transaction in the chronological order of the set of transactions that were executed in relation to the object.

Continuing the above example, the current state is now Pending 202. The publisher has already determined that the Commit transaction is executable from the current state of the object. Hence, the publisher determines that the Commit transaction was executed from the current state of the object. Additionally, the publisher determines that the Commit transaction is the next transaction in a chronological order of the set of transactions executed in relation to the object. Based on the above determinations, the chronological order of transactions now includes: the Prepare transaction, and the Commit transaction.

One or more embodiments include determining whether there are any remaining transactions (Operation 520). The publisher determines whether there are any transactions that were executed in relation to the object but have not yet been placed in the chronological order of transactions.

If there is one or more remaining transactions, then the publisher iterates Operations 512-520 with respect to the remaining transactions. Based on the iteration, the publisher recursively determines the chronological order of the remaining transactions.

If there are no more remaining transactions, then process ends.

Continuing the above example, the set of transactions executed in relation to an object is: a Commit transaction, a Delete transaction, a Garbage Collect transaction, and a Prepare transaction. The Prepare transaction and the Commit transaction have already been placed in the chronological order of transactions. Hence, the Delete transaction and the Garbage Collect transaction are remaining. The publisher iterates Operations 512-520 with respect to the Delete transaction and the Garbage Collect transaction.

The publisher determines a next state of the object based on the preceding state (Pending 202) and the preceding transaction (Commit). Based on the state machine 200, the publisher determines that the next state is Commit 204. The publisher sets Commit 204 as the "current state."

The publisher determines a set of transaction types executable from the Commit 204 state. Based on the state machine 200, the set of transaction types executable from the Commit 204 state is Update 226, Overwrite 228, and Delete 230.

The publisher determines that the Delete transaction that was executed in relation to the object is executable from the Commit 204 state. The Garbage Collect transaction is not executable from the Commit 204 state.

The publisher determines that the Delete transaction was executed in relation to the object while the object was in the Commit 204 state. The publisher also orders the Delete transaction as the next transaction in the chronological order of transactions. Based on the above determinations, the chronological order of transactions now includes: the Prepare transaction, the Commit transaction, and the Delete transaction.

The publisher determines that the Garbage Collect transaction has not been placed into the chronological order of transactions. The publisher iterates Operations 512-520 with respect to the Garbage Collect transaction.

The publisher determines a next state of the object based on the preceding state (Commit 204) and the preceding transaction (Delete). Based on the state machine 200, the publisher determines that the next state is Deleted 210. The publisher sets Deleted 210 as the "current state."

The publisher determines a set of transaction types executable from the Deleted 210 state. Based on the state machine 200, the set of transaction types executable from the Deleted 210 state is Garbage Collect 232.

The publisher determines that the Garbage Collect transaction that was executed in relation to the object is executable from the Deleted 210 state.

The publisher determines that the Garbage Collect transaction was executed in relation to the object while the object was in the Deleted 210 state. The publisher also orders the Garbage Collect transaction as the next transaction in the chronological order of transactions. Based on the above determinations, the chronological order of transactions now includes: the Prepare transaction, the Commit transaction, the Delete transaction, and the Garbage Collect transaction. There are no more remaining transactions to be included in the chronological order of transactions.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
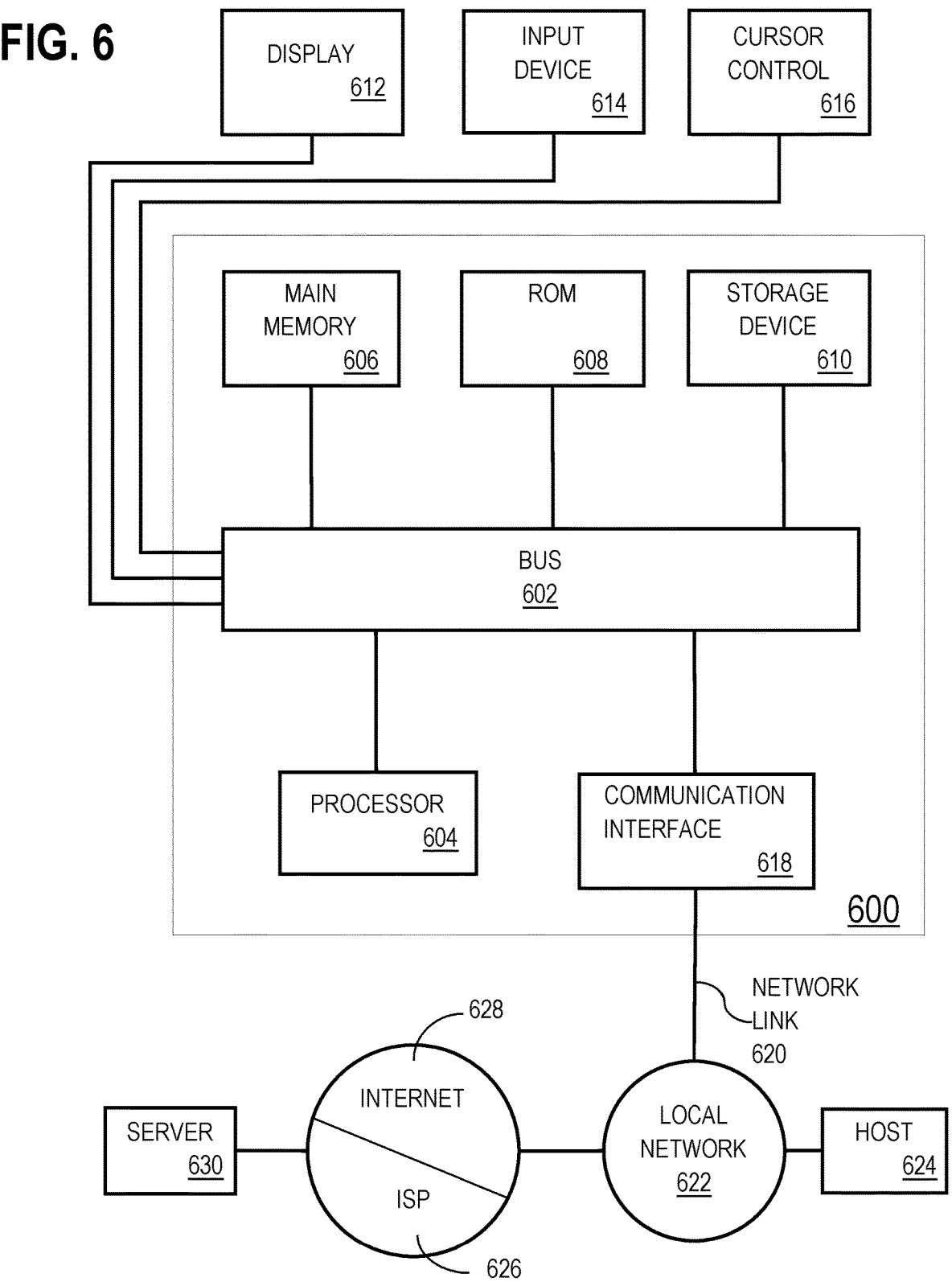
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause a transactional manager to perform operations comprising:
    identifying by the one or more hardware processors a plurality of executed transactions that have been executed in relation to a first object of a plurality of objects in a storage system,
    wherein:
    executed transactions in the plurality of executed transactions are not chronological;
    a first executed transaction is included before a second executed transaction is included in the plurality of executed transactions; and
    the first executed transaction was executed after the second executed transaction;
    identifying by the one or more hardware processors a possible chronological ordering of the plurality of executed transactions, wherein:
    the identifying uses a finite state machine to iteratively determine the possible chronological ordering,
    the finite state machine is stored in a non-transitory computer-readable storage device,
    the stored finite state machine is associated with the storage system
    the stored finite state machine specifies (a) a plurality of possible states assumable by the plurality of objects and (b) a plurality of possible transaction types executable from the plurality of possible states, for one or more possible states of the plurality of possible states, the stored finite state machine specifies one or more possible transaction types of the plurality of possible transaction types,
based on the plurality of possible states and the plurality of possible transaction types executable from the plurality of possible states, the stored finite state machine defines one or more possible sequences of the executed transactions on the plurality of objects,
wherein identifying the possible chronological ordering comprises:
identifying, by the one or more hardware processors, an initial state, of the plurality of possible states within the stored finite state machine, associated with the first object by comparing the plurality of executed transactions to sets of possible transaction types executable from individual possible states of the plurality of possible states within the stored finite state machine;
identifying, by the one or more hardware processors, from the plurality of possible transaction types within the stored finite state machine, a set of possible transaction types which are executable from the initial state;
determining, by the one or more hardware processors, that a first particular transaction, of the plurality of executed transactions, corresponds to one transaction type of the set of possible transaction types within the stored finite state machine executable from the initial state; and
placing the first particular transaction as an initial chronological transaction in the possible chronological ordering of the plurality of executed transactions;
wherein identifying the possible chronological ordering further comprises iteratively determining a candidate chronological order of remaining executed transactions of the plurality of executed transactions until each of the remaining executed transactions are placed in the possible chronological ordering by:
identifying, by the one or more hardware processors, a current next state, of the plurality of possible states within the stored finite state machine, associated with the first object;
identifying, by the one or more hardware processors, from the plurality of possible transaction types within the stored finite state machine, a set of possible transaction types executable from the next state;
determining, by the one or more hardware processors, that a next particular transaction, of the plurality of executed transactions, corresponds to one transaction type of the set of possible transaction types within the stored finite state machine executable from the next state;
placing, by the one or more hardware processors, the next particular transaction as the next chronological transaction in the possible chronological ordering of the plurality of executed transactions;
wherein the plurality of executed transactions in the possible chronological ordering includes the first executed transaction being ordered after the second executed transaction based on the first executed transaction being executed after the second executed transaction; and
responsive to determining, by the one or more hardware processors, a last transaction type of the possible chronological ordering of the first object was a delete transaction placing the first object in a deleted state, reclaiming memory space of the storage system corresponding first object for storing new information in the storage system by performing a garbage collection transaction.

2. The media of claim 1, wherein the instructions further cause:
in a first iteration of the iteratively determining the candidate chronological order of remaining executed transactions, the next state comprises a first state:
determining that the first executed transaction and the second executed transaction, of the plurality of transactions, correspond to one or more of a first set of possible transaction types executable from the first state;
determining that a transaction history associated with the first object includes information identifying the first executed transaction prior to information identifying the second executed transaction; and
placing the first executed transaction as the next transaction in the candidate chronological order of the plurality of transactions.

3. The media of claim 1, wherein the instructions further cause:
in a first iteration of the iteratively determining the candidate chronological order of remaining executed transactions, the next state comprises a first state:
determining that the first executed transaction and the second executed transaction, of the plurality of transactions, correspond to one or more of a first set of possible transaction types executable from the first state;
determining that a first timestamp associated with the first executed transaction is prior to a second timestamp associated with the second executed transaction; and
placing the first executed transaction as the next transaction in the candidate chronological order of the plurality of transactions.

4. The media of claim 1, wherein ordering a subset of the plurality of transactions that is associated with a same transaction type is further based on a sequence in which information identifying each of the subset of transactions is recorded within a transaction history associated with the first object.

5. The media of claim 1, wherein ordering a subset of the plurality of transactions that is associated with a same transaction type is further based on a respective timestamp associated with each of the subset of the plurality of transactions.

6. The media of claim 1, wherein the plurality of transactions executed in relation to the first object is identified from metadata associated with the first object.

7. The media of claim 1, wherein the instructions further cause:
identifying a second plurality of transactions executed in relation to a second object of the plurality of objects in the storage system;
identifying a second possible chronological ordering of the second plurality of transactions;
wherein the possible chronological ordering of the plurality of transactions indicates that the first second executed transaction precedes the first executed transaction, and the second possible chronological ordering of the second plurality of transactions indicates a third executed transaction precedes a fourth executed transaction;
concurrently publishing, to a stream of a messaging infrastructure, information identifying a set of two or more transactions executed in relation to two or more objects of the plurality of objects, wherein the set of two or more transactions includes the first executed transaction and the third executed transaction and excludes the second executed transaction and the fourth executed transaction; and responsive at least to receiving a first acknowledgement of receipt of at least the information identifying the first executed transaction: publishing, to the stream, information identifying the second executed transaction;

wherein the second executed transaction is not published until the first acknowledgement of the receipt of the information identifying the first executed transaction is received.

8. The media of claim 7, wherein the instructions further cause:

responsive to not receiving a second acknowledgement of receipt of the information identifying the third executed transaction within a threshold time period: refraining from publishing, to the stream, information identifying the fourth executed transaction.

9. The media of claim 7, wherein:

each of the plurality of objects is assigned to a respective group of a plurality of groups;

each of a plurality of publishers is assigned to a respective group of the plurality of groups; and a publisher of a particular group is configured to publish information identifying transactions executed in relation to objects of the particular group.

10. The media of claim 7, wherein the instructions further cause:

identifying a modified-object index that (a) includes entries corresponding to a first set of objects, of the plurality of objects, that is associated with at least one transaction record that has not yet been published and (b) does not include entries corresponding to a second set of objects, of the plurality of objects, that is not associated with any transaction records that have not yet been published; and based on the modified-object index, identifying transaction records for publication based on respective metadata associated with the first set of objects, but not based on respective metadata associated with the second set of objects.

11. The media of claim 10, wherein the instructions further cause:

generating the modified-object index based on a respective marked object-modified flag associated with each of the first set of objects.

12. The media of claim 7, wherein the instructions further cause:

executing a plurality of publishers comprising a first publisher and a second publisher, wherein the first publisher is associated with a first set of objects of the plurality of objects and the second publisher is associated with a second set of objects of the plurality of objects, and wherein the first set of objects comprises the first object and the second object;

concurrently scanning, by the plurality of publishers, an index;

based on scanning the index by the first publisher: identifying a first set of transactions executed in relation to the first set of objects as transactions to be published by the first publisher, wherein the first set of transactions comprises the plurality of transactions and the second plurality of transactions; and based on scanning the index by the second publisher: identifying a second set of transactions executed in relation to the second set of objects as transactions to be published by the second publisher.

13. The media of claim 12, wherein the instructions further cause:

determining that a first group, of a plurality of groups, is associated with the first object; and determining that the first group is associated with the second object;

wherein identifying the first set of transactions executed in relation to the first set of objects as transactions to be published by the first publisher is responsive to determining that a subset of the plurality of groups associated with the first publisher comprises the first group.

14. The media of claim 13, wherein the instructions further cause:

evenly distributing the plurality of objects to the plurality of groups based on a modulo of a hash of each object name of each of the plurality of objects.

15. The media of claim 1, wherein the instructions further cause:

determining that respective object-modified flags associated with a first set of objects, of the plurality of objects, are marked;

generating a modified-object index that (a) includes entries corresponding to the first set of objects, and (b) does not include entries corresponding to a second set of objects, of the plurality of objects, associated with respective object-modified flags that are not marked;

based on the modified-object index, identifying transaction records for publication based on respective metadata associated with the first set of objects, but not based on respective metadata associated with the second set of objects;

wherein metadata associated with the first object comprises a transaction history associated with the first object;

wherein ordering a subset of the plurality of transactions that is associated with a same transaction type is further based on (a) a sequence in which information identifying each of the subset of the plurality of transactions is recorded within a transaction history associated with the first object, and (b) a respective timestamp associated with each of the subset of the plurality of transactions;

identifying a second plurality of transactions executed in relation to a second object of the first set of objects;

identifying a second ordering of the second plurality of transactions;

wherein the ordering of the plurality of transactions indicates that the first executed transaction precedes the second executed transaction, and the second ordering of the second plurality of transactions indicates a third executed transaction precedes a fourth executed transaction;

concurrently publishing, to a stream of a messaging infrastructure, information identifying a set of two or more transactions executed in relation to two or more objects of the plurality of objects, wherein the set of two or more transactions includes the first executed transaction and the third executed transaction and excludes the second executed transaction and the fourth executed transaction;

responsive at least to receiving a first acknowledgement of receipt of at least the information identifying the first executed transaction: publishing, to the stream, information identifying the second executed transaction;

wherein the second executed transaction is not published until the first acknowledgement of the receipt of the information identifying the first executed transaction is received;

responsive to not receiving a second acknowledgement of receipt of the information identifying the third executed transaction within a threshold time period: refraining from publishing, to the stream, information identifying the fourth executed transaction;

evenly distributing the plurality of objects to a plurality of groups based on a modulo of a hash of each object name of each of the plurality of objects;

executing a plurality of publishers comprising a first publisher and a second publisher, wherein the first publisher is associated with a first group of objects of the plurality of objects and the second publisher is associated with a second group of objects of the plurality of objects, and wherein the first group of objects comprises the first object and the second object;

concurrently scanning, by the plurality of publishers, an index;

based on scanning the index by the first publisher: identifying a first set of transactions executed in relation to the first group of objects as transactions to be published by the first publisher, wherein the first set of transactions comprises the plurality of transactions and the second plurality of transactions; and based on scanning the index by the second publisher: identifying a second set of transactions executed in relation to the second group of objects as transactions to be published by the second publisher.

* * * * *

UNITED STATES PATENT AND TRADEMARK OFFICE
CERTIFICATE OF CORRECTION

PATENT NO. : 11,726,979 B2
APPLICATION NO. : 15/370165
DATED : August 15, 2023
INVENTOR(S) : Sawhney It is certified that error appears in the above-identified patent and that said Letters Patent is hereby corrected as shown below:

In the Claims

In Column 19, Line 38, in Claim 1, before "next" delete "current".

In Column 20, Line 57, in Claim 7, after "the" delete "first".

Signed and Sealed this
Twenty-eighth Day of May, 2024

Katherine Kelly Vidal
*Director of the United States Patent and Trademark Office*